May 10, 1966  D. N. GOLDBERG  3,250,111
RIVET HOLDING TOOL
Filed Jan. 24, 1964
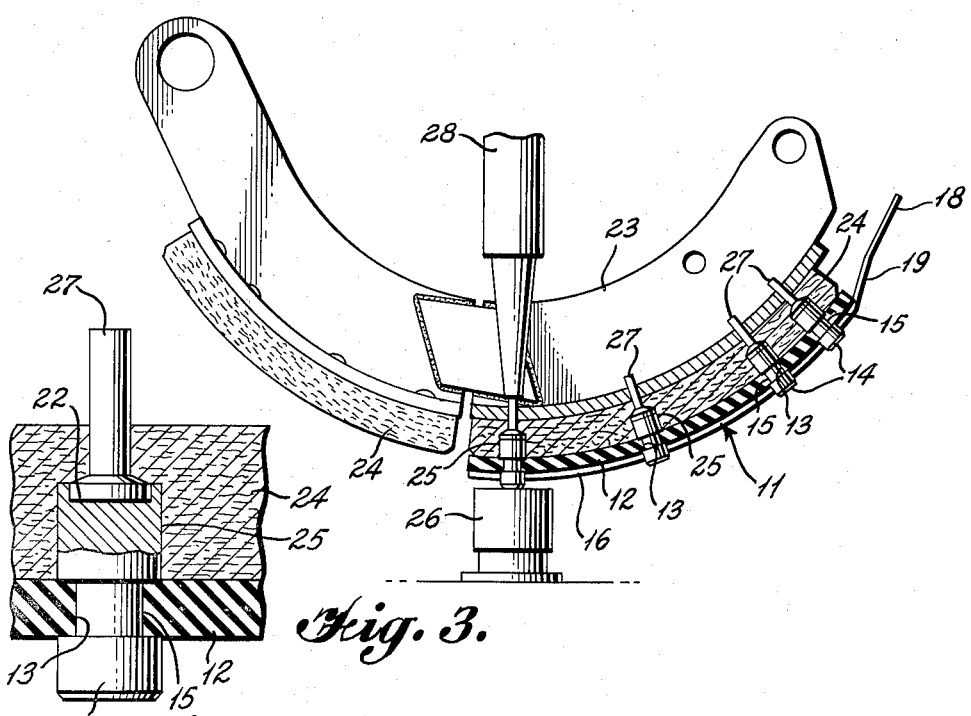
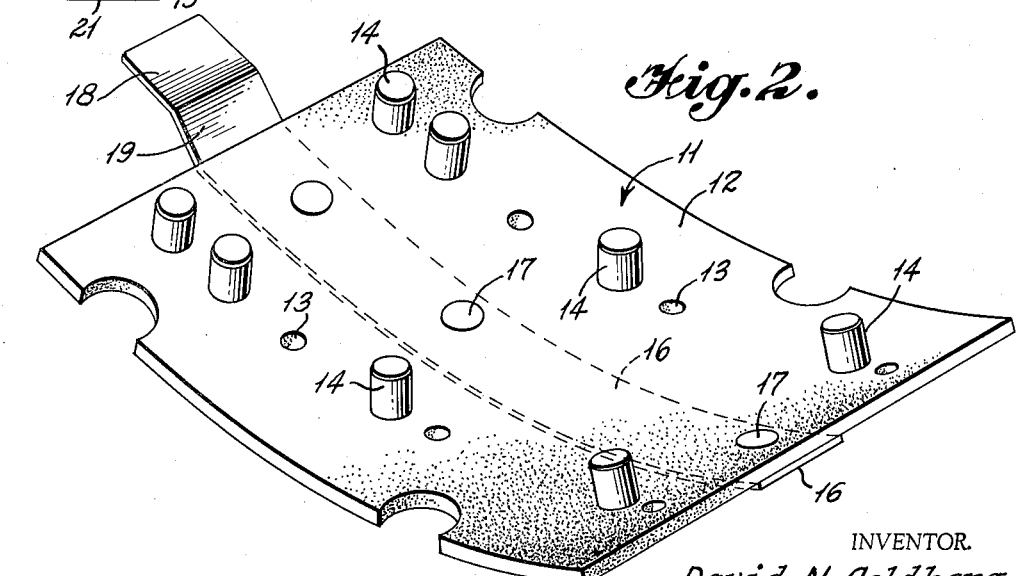
INVENTOR.
David N. Goldberg
BY
Irons, Birch, Swindler & McKie
ATTORNEYS United States Patent Office 3,250,111
Patented May 10, 1966

1

3,250,111
RIVET HOLDING TOOL
David N. Goldberg, 1510 Main St., Wheeling, W. Va.
Filed Jan. 24, 1964, Ser. No. 339,926
10 Claims. (Cl. 72—462)

This invention relates to the art of riveting and more particularly to a rivet holding tool for use in applying lining material to brake shoes whereby the tool simultaneously retains and supports a plurality of rivets in position relative to the shoe being lined for an upsetting operation.

It heretofore has been common practice in the art of riveting to secure together parts and assemblies by utilizing one or more rivets comprised of a shank portion and an integral head portion, the shank portion extending through and protruding from suitable aligned openings provided in the parts or assemblies to be joined. The head portion of the rivet normally may either be exposed externally upon one of the parts or may be disposed within a countersunk hole in one of the parts. The riveting is accomplished by supporting the head portion of the rivet on an anvil member while the end of the shank portion of the rivet is upset or otherwise deformed by any suitable force applying means to form a second head portion which secures the parts together.

In many riveting operations it is necessary to employ a large number of rivets distributed at spaced locations over the area of the parts to be joined. In lining brake shoes, for example, a plurality of rivets are employed to secure the brake lining to the brake shoe. Heretofore, the rivets have usually been placed in position and upset one at a time. This procedure is very time consuming, thus adding greatly to the manufacturing costs. Further, while the first few rivets are being set, there is the problem of holding the parts in the desired relation to each other that they are to have in the final riveted state. Thus, while the parts are not securely fastened by the first few rivets that are set, the parts can shift relative to each other such that the pre-drilled holes in the lining material may not line up with the rivet holes in the shoe as the last rivets are attempted to be inserted for upsetting. A major problem has been to find a simple and economical way of speeding up the riveting operation by simultaneously supporting or holding a plurality of rivets in position in a work piece so that a plurality of rivets may be successively upset without the necessity of stopping to insert each individual rivet for upsetting and without the nuisance of having to reposition the lining material and shoe to each other so that the lining and shoe rivet holes will align over the entire area of the shoe being lined.

Accordingly, it is an object of the present invention to provide an improved rivet holding tool which simultaneously maintains and supports a plurality of rivets in position in a work piece during an upsetting operation such that the rivets hold the parts in proper relation.

Another object of the invention is to provide such a rivet holding tool which is flexible so that it may readily conform to the configuration of the work pieces.

Still another object of the invention is to provide such a rivet holding tool which is resilient in nature to permit it to snap back to an original position when not permanently deformed.

A further object is to provide such an improved rivet holding tool which will engage the work pieces and hold

2 itself and the work pieces in position once it has been applied thereto.

A still further object of the invention is to provide such a rivet holding tool which is inexpensive and simple to construct.

The invention generally involves a rivet holding tool comprising a sheet of flexible material, a plurality of anvils mounted in said sheet to maintain and support a plurality of rivets in position in work pieces during a rivet upsetting operation, said anvils being spaced in said sheet in a pattern which corresponds to the spacing of the rivets to be upset, and a resilient metal strip to facilitate the forming of said sheet into a configuration which generally conforms with the configuration of the work pieces being riveted to permit said anvils to be properly aligned with said rivets to be upset.

The invention having been broadly described, a preferred specific embodiment will now be discussed in detail with reference to the accompanying drawings in which:

FIGURE 1 is a side elevational view partly in cross section of a rivet holding tool according to the present invention showing the tool in position on a brake lining material and shoe during a rivet upsetting operation;

FIGURE 2 is a perspective view of a rivet holding tool according to the present invention; and FIGURE 3 is an enlarged view of a modified form of an anvil to be used with the rivet holding tool of the present invention.

Illustrated in the drawings is a rivet holding tool generally referred to by the reference numeral 11. The rivet holding tool 11 generally comprises an elongated sheet 12 of any suitable flexible material such as rubber which may be constructed of any desired size in accordance with the area of the work pieces to be joined.

A plurality of openings 13 are formed in sheet 12 to receive a plurality of anvils 14. The anvils 14 are generally cylindrical in form with flat top and bottom faces and are provided with grooves 15 around their peripheries intermediate their ends to engage sheet 12 and secure the anvils therein. The anvils 14 may be constructed of any suitable material such as metal, and may be spaced in sheet 11 in any desired pattern to correspond to the pattern or spacing of the rivet locations in the work pieces that are to be joined. In the form shown in FIGURE 2, the anvils 14 are in spaced alignment to form two rows adjacent the edges of sheet 12 so that the rivet holding tool is particularly adapted for use in a brake lining operation.

In constructing the rivet holding tool 11, the anvils 14 may be inserted into the openings 13 of flexible sheet 12 by forcing one end of the anvils into the openings until the grooves 15 engage the edges of the openings. By so inserting the anvils in the openings, the openings are initially deformed to permit the ends of the anvils to pass therethrough. Consequently, the anvils are securely retained in the openings when the material of sheet 12 snaps back to its original form and engages the grooves of the anvils.

A resilient metal strip 16 is attached to one surface of sheet 12 by any suitable means such as rivet fasteners 17. Metal strip 16 preferably is located centrally of sheet 12 and facilitates the forming of the sheet into a configuration which generally conforms with the configuration of the work pieces being riveted to permit the anvils 14 in the sheet to be properly aligned with the rivets to be upset in the work pieces. By constructing strip 16 of a resilient metal material it will snap back to its original position when not permanently deformed. This is advantageous in that it permits the rivet holding tool 11 to be readily adapted for use on work pieces having a variety of configurations without permanently changing the configuration of the tool itself. If desired, however, metal strip 16 may be permanently deformed to any desired configuration.

An integral extension of strip 16 extends outwardly from one end of sheet 12 to constitute handle means 18 for the rivet holding tool 11. This handle means 18 may be angularly bent as at 19 for ease of handling.

Illustrated in FIGURE 3 is a modified form of an anvil 21 which may be used in place of the anvil 14 shown in FIGURES 1 and 2. Anvil 21 differs from anvil 14 basically in that it is provided with a depression 22 on one end thereof to engage the head of a rivet. This type of anvil is suited for use either where the head portion of the rivet to be upset is exposed on the exterior of the work piece or where the head portion of the rivet is disposed within a countersunk hole.

To use rivet holding tool 11, the anvils 14 are mounted in sheet 12 in a pattern which corresponds to the pattern of the rivets to be upset in work pieces. The tool 11 is formed or bent into a configuration which generally conforms to the configuration of the work piece being riveted. The tool is applied to the work piece so that the ends of the anvils engage the heads of the rivets and retain the rivets in the work piece in proper position for a rivet upsetting operation. The resilient nature of the tool permits it to hold itself in position once it has been applied to the work pieces. For example, when the tool is used on work pieces having an arcuate configuration, the tool is bent to an arcuate configuration which is slightly smaller than the arcuate configuration of the work pieces to be riveted. When the tool is applied to the work pieces it therefore must be deformed a small amount to permit the anvils in the tool to properly engage the rivets in the work pieces. Since the tool is resilient in nature, it has a tendency to go back to its original configuration. This creates a binding force which tends to hold the tool in position on the work pieces.

The rivet holding tool of the present invention is particularly adapted for use on arcuate or curved surfaces such as brake lining sections and brake shoes. Illustrated in FIGURE 1 is a brake shoe 23 having a section of the lining material 24 attached thereto. The lining sections shown in FIGURE 1 are of a type wherein the rivets 27 attaching the lining sections to the brake shoe are disposed within countersunk holes 25 on one face of the lining. The shank portions of the rivets 27 extend through suitable aligned openings in the brake shoe and the lining section so that the protruding ends of the rivets may be upset to securely attach the lining section to the brake shoe. To effect a rivet upsetting operation, the rivet holding tool 11 is applied to one of the lining sections 24 so that the anvils 14 are disposed within the countersunk holes 25. It is to be noted that the tool is bent in the form of a segment of a circle to conform generally with the curved configuration of the brake lining section and shoe. The ends of the anvils engage the heads of the rivets to retain the rivets in proper position and in turn the shanks of the group of rivets hold the brake shoe and lining section in proper relation to each other. The protruding ends of the rivet shanks are then upset by any suitable force applying means. The force applying means or riveting machine shown in FIGURE 1 is accomplished by supporting in succession the outside end of each anvil on fixed member 26 while the protruding shank end of the rivet is upset or otherwise deformed by force applied by movable member 27. It is important to note that while one rivet is being set, the presence of the remaining rivets awaiting to be upset holds the brake shoe and lining section in proper relation to each other until all of the rivets have been upset.

While the invention has been described with particular reference to a preferred specific embodiment, many other modifications may be made by persons skilled in the art without departing from the scope of the invention which is defined solely by the appended claims.

What is claimed is:
1. A rivet holding tool for lining brakes comprising
   a curved flexible sheet in the form of a segment of a circle to conform with the curved configuration of a brake lining section and brake shoe,
   a plurality of anvils mounted in said sheet to maintain and support the heads of a plurality of rivets disposed in the lining section and brake shoe during a rivet upsetting operation, said anvils being spaced in said sheet in a pattern corresponding to the desired location of the rivets to be upset,
   a resilient metal strip attached to one surface of said sheet centrally thereof to retain said sheet in a generally curved configuration which conforms with the curved configuration of said brake lining section and brake shoe to permit said anvils to be properly aligned with the rivets in the brake lining section and brake shoe,
   and handle means projecting outwardly from said sheet.
2. A rivet holding tool comprising
   a sheet of flexible material,
   a plurality of anvils mounted in said sheet each to maintain and support a rivet in position in work pieces to be joined by a rivet upsetting operation, said anvils being spaced in said sheet in a predetermined pattern corresponding to the desired location of the rivets on the work pieces,
   an a resilient strip secured to said sheet to retain said sheet in a configuration which generally conforms with the configuration of the work pieces being riveted together to permit said anvils to be properly aligned with the rivets that are to be upset.
3. A rivet holding tool as defined in claim 2 wherein each of said anvils is cylindrical in form and is provided with a groove around its periphery intermediate its ends to be engaged by said flexible sheet and secure said anvil therein.
4. A rivet holding tool as defined in claim 3 wherein each of said anvils is provided with a depression on one end thereof to engage the head of a rivet.
5. A rivet holding tool as defined in claim 2 wherein said flexible sheet is comprised of rubber.
6. A rivet holding tool as defined in claim 2 wherein said resilient strip is attached to one surface of said flexible sheet centrally thereof.
7. A rivet holding tool as defined in claim 2 which includes handle means projecting outwardly from said sheet.
8. A rivet holding tool as defined in claim 7 wherein said handle means comprises an integral extension of said strip.
9. A rivet holding tool comprising
   a flexible rubber sheet having a plurality of openings therein,
   a plurality of generally cylindrical anvils, one mounted in each of said openings to maintain and support the heads of a plurality of rivets in position in work pieces being joined during a rivet upsetting operation, said anvils being spaced in said sheet in a pattern corresponding to the desired location of the rivets on the work pieces, each of said anvils additionally being provided with a groove around its periphery intermediate its ends to be engaged by said sheet and secure said anvils therein,
   a resilient metal strip attached to one surface of said sheet centrally thereof to retain said sheet in a configuration which generally conforms with the configuration of the work pieces being riveted together to permit said anvils to be properly aligned with the rivets that are to be upset,
   and handle means projecting outwardly from said sheet.

10. A rivet holding tool comprising
wall means providing a surface area to overlie the work pieces to be joined,
said wall means being resilient to permit it to be formed and retained in a configuration which generally conforms with the configuration of the work piece to be joined,
and a plurality of anvils mounted in said wall means each to maintain and support a rivet in position in the work pieces during a rivet upsetting operation, said anvils being spaced in said wall means in a predetermined pattern corresponding to the desired location of the rivets on the work pieces.

References Cited by the Examiner

UNITED STATES PATENTS

| | | | |
|---|---|---|---|
| 617,834 | 1/1899 | Moore | 29—243.54 |
| 1,373,427 | 4/1921 | Houser | 72—325 |

CHARLES W. LANHAM, *Primary Examiner.*

G. P. CROSBY, *Examiner.*